United States Patent [19]

Nagata

[11] Patent Number: 4,805,958
[45] Date of Patent: Feb. 21, 1989

[54] SUNROOF HOUSING FOR AUTOMATIVE VEHICLES

[75] Inventor: Kazuhisa Nagata, Okazaki, Japan

[73] Assignee: Aisin Seiki Kabushiki Kaisha, Aichi, Japan

[21] Appl. No.: 38,948

[22] Filed: Apr. 16, 1987

[30] Foreign Application Priority Data

Apr. 28, 1986 [JP] Japan .................. 61-63302

[51] Int. Cl.$^4$ .................. B60J 7/00; B60J 7/20
[52] U.S. Cl. .................. 296/216; 296/901
[58] Field of Search .............. 296/216, 221, 222, 191, 296/73, 31 P

[56] References Cited

U.S. PATENT DOCUMENTS

| 3,078,122 | 2/1963 | Werner | 296/222 |
| 4,115,974 | 9/1978 | Purcell | 296/191 |
| 4,293,161 | 10/1981 | Lutz | 296/216 X |
| 4,416,487 | 11/1983 | Hirotani et al. | 296/222 |
| 4,422,687 | 12/1983 | Kaltz et al. | 296/221 |
| 4,632,449 | 12/1986 | Masuda | 296/222 |

FOREIGN PATENT DOCUMENTS 58-177715 10/1983 Japan .

Primary Examiner—Dennis H. Pedder
Attorney, Agent, or Firm—Finnegan, Henderson, Farabow, Garrett & Dunner

[57] ABSTRACT

A synthetic resin housing accommodates a sunroof adapted to open and close a window formed in the stationary roof of an automotive vehicle. The housing includes a transversely extending reinforcing plate imbedded therein and having two end portions fixedly secured to the inner side of the stationary roof to support the housing and increase its rigidity.

4 Claims, 3 Drawing Sheets

SUNROOF HOUSING FOR AUTOMATIVE VEHICLES

BACKGROUND OF THE INVENTION

This invention relates to a sunroof housing for an automotive vehicle which results in increased sunroof strength.

A housing for accommodating the sunroof of an automotive vehicle such as an automobile generally consists of a molded synthetic resin in order to lighten the weight of the overall vehicle. The housing is necessarily large because it is molded into an intregal body which cannot be split into sections. The integrally molded housing is adapted to be mounted on the stationary roof of the vehicle between the inner side thereof and a decorative panel facing the passenger compartment. The housing allows the sunroof to be slid back and forth to open and close a window formed therein.

The problem with the conventional housing structure is that the housing tends to sag at the central portion on the rearward side of the window opening. Thus, the underlying decorative panel is deformed, resulting in an unattractive appearance in the passenger compartment.

SUMMARY OF THE INVENTION

Accordingly, an object of the present invention is to provide a sunroof housing of improved mechanical strength. A further object is to prevent sagging of the sunroof housing.

To achieve the above and other objectives and in accordance with the purpose of the invention, as embodied and broadly described herein, a housing for accommodating a sunroof formed in a stationary roof of an automotive vehicle which is adapted to allow opening and closing of the window. The housing comprises a synthetic resin body fixedly attached to an inner side of the stationary roof at the window for receiving the sunroof and having an opening corresponding to the window, a metal reinforcing plate imbedded in the body along a rearward edge of the opening and including two end portions fixedly secured to the inner side of the stationary roof for supporting the body.

The reinforcing plate's cross section is designed for increased rigidity and, the rigidity of the housing to prevent sagging.

Other features and advantages of the present invention will be apparent from the following description taken in conjunction with the accompanying drawings, in which like reference characters designate the same or similar parts throughout the figures thereof.

DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE PREFERRED EMBODIMENT

Figure 1:
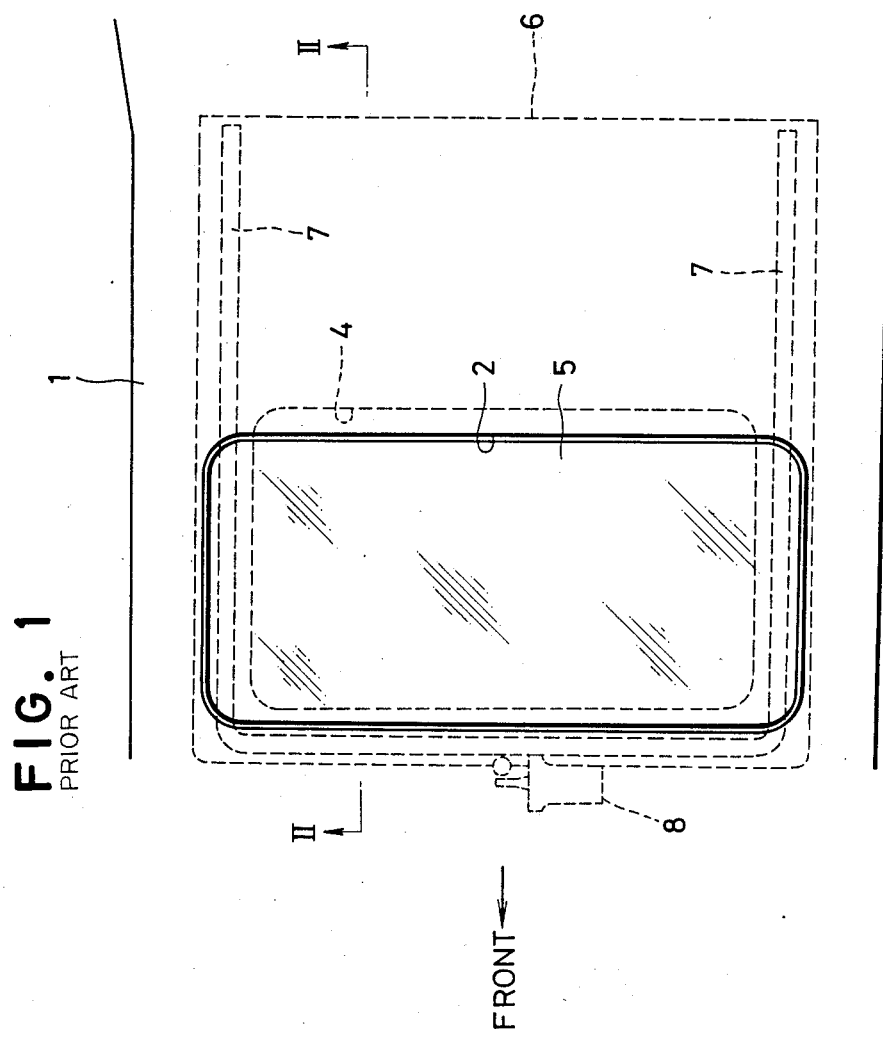
FIG. 1 is a partial plan view illustrating a sunroof housing structure according to the prior art.
Figure 2:
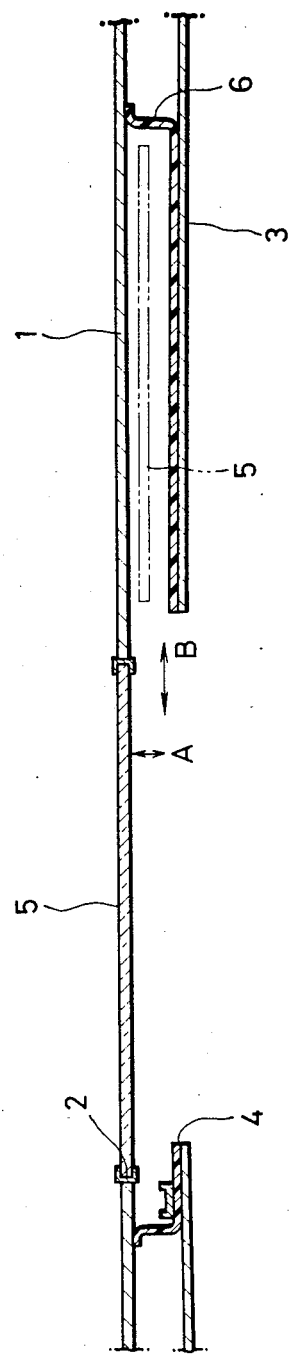
FIG. 2 is a sectional view taken along line II—II of FIG. 1.

Before describing an embodiment of the present invention in detail, references will be had to FIGS. 1 and 2 for a more detailed review of the art to which the present invention appertains.

FIGS. 1 and 2 illustrate the general structure of a conventional housing for a sliding-type sunroof adaptable to an automotive vehicle. A vehicle has a stationary roof 1 the forward portion of which is provided with a window opening 2. A decorative panel 3 installed in the passenger compartment and contains an opening 4. Therefore passenger compartment communicates with the atmosphere through the window opening 2 and panel opening 4. A sliding-type sunroof 5 is arranged so as to open and close the window opening 2 so that the passanger compartment can be brought into communication with or cut off from the atmosphere. As shown in FIG. 2, in order to open and close the window opening 2, the sunroof 5 can be raised and lowered as indicated by arrows A and moved back and forth as indicated by arrows B by means of a powered or manual drive unit 8 (FIG. 1). The phantom lines in FIG. 2 show the sunroof 5 in the fully retracted state, while the solid lines show the sunroof fitted snugly into the window opening 2 to close the same.

Attached to the stationary roof 1 between the roof and the decorative panel 3 is a housing 6 provided with an opening sized to that of the panel opening 4 and including a pair of guide rails 7 attached thereto for guiding the motion of the sunroof 5. The housing 6 receives the sunroof 5 and accommodates the same internally thereof when the sunroof 5 is disengaged from the window opening 2 and slid along the guide rails 7.

The housing 6 is molded of synthetic resin in order to reduce the weight of the vehicle. It is also comparatively large in size since it is molded as a unitary body which cannot be divided into sections.

When the integrally molded housing 6 is attached to the stationary roof 1 of the vehicle, the central part of the housing behind the rearward edge of the window opening 2 develops sag. As a result, the housing 6 presses against the decorative panel 3 from the inner side and causes the panel to deform. Consequently, the appearance of the decorative panel 3 within the passenger compartment is affected.

The present invention is directed to solving the foregoing problem and will now be described in detail with reference to FIGS. 3 and 4. Note, elements which are similar to those shown in FIGS. 1 and 2 are designated by like reference characters and will not be described.

Figure 3:
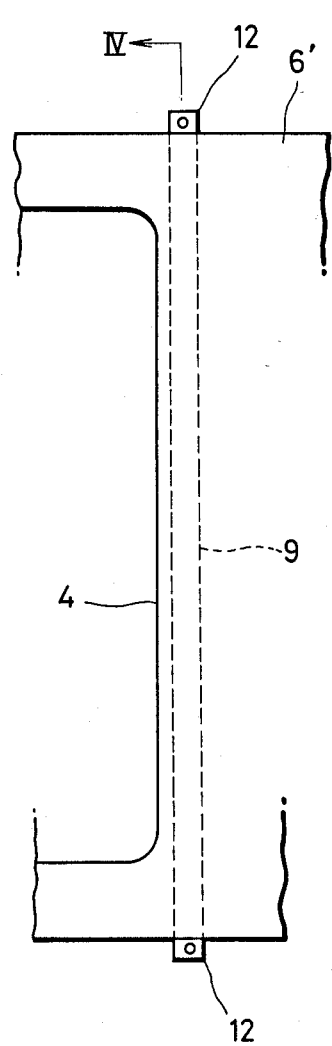
FIG. 3 is a partial plan view of a preferred embodiment of a sunroof housing according to the present invention and showing a portion of the housing rearwardly of an opening.
Figure 4:
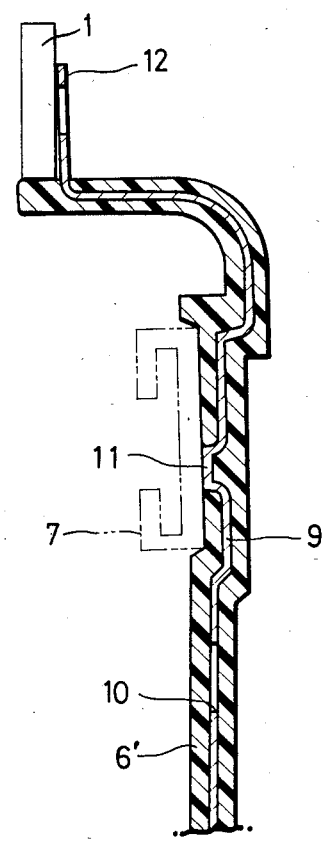
FIG. 4 is a partial sectional view taken along line IV of FIG. 3.

As shown in FIGS. 3 and 4, a sunroof housing 6' is provided with a metal reinforcing plate 9 which is imbedded in the housing 6' along the rearward edge of the opening 4. The housing 6' may consist of a material such as fiber-reinforced plastic (FRP). The reinforcing plate 9 has a stepped cross-sectional configuration designed to furnish the plate with sufficient rigidity. Furthermore, the reinforcing plate 9 is provided with a hole 10 at a suitable location so that the plastic material constituting the housing 6 will fill the hole to unite the plastic material on both sides of the reinforcing plate 9. The reinforcing plate 9 is formed to include a projection 11 which comes into contact with the mold when the housing 6' is formed. This prevents the reinforcing plate 9 from leaning to one side during the molding operation.

The two ends of the reinforcing plate 9 are bent to form flanges 12 each of which is provided with a hole. The reinforcing plate 9 is attached to the stationary roof 1 by securing the flanges 12 to the inner side of roof 1 with screw-type means. Thus, the reinforcing plate 9 is effective in supporting and improving the rigidity of the housing 6' at the rearward edge of opening 4.

As previously explained, the advantage of the invention is that by improving the rigidity of the housing 6' through use of the reinforcing plate 9, the housing 6' can be reduced in thickness without fear of sagging.

It should be noted that the reinforcing plate 9 can also serve as a member for mounting a passenger compartment light and can be utilized as an electrical grounding member.

Other embodiments of the invention will be apparent to those skilled in the art form consideration of the specification and the practice of the invention disclosed herein. It is intended that the specification and examples be considered as exemplary only, with the true scope and spirit of the invention be indicated by the following claims.

What is claimed is:

1. A housing for accommodating a vehicle sunroof adapted to open and close a window formed in a stationary roof having an inner side, said housing comprising:
   a housing body made of a synthetic resin fixedly attached to the inner side of the stationary roof at the window for receiving the sunroof and having an opening corresponding to the window; and
   a reinforcing plate having a stepped cross-section portion discontinuously enclosed within said housing body along a substantial length of said reinforcing plate, said reinforcing plate being disposed along a rearward portion of said opening and having two end portions adapted to be fixedly secured to the inner side of the stationary roof for supporting the housing body.

2. The housing according to claim 1, wherein said reinforcing plate consists of metal.

3. The housing according to claim 1, wherein each end portion of said reinforcing plate has a flange adapted to be fixedly secured to the inner side of the stationary roof.

4. The housing according to claim 1, further comprising a pair of guide rails attached to said housing body for receiving the sunroof and slidingly guiding the sunroof therealong.

* * * * *